United States Patent
Butler

(10) Patent No.: US 8,910,750 B2
(45) Date of Patent: Dec. 16, 2014

(54) TREE STAND

(71) Applicant: Rhett Butler, Saint Simons, GA (US)

(72) Inventor: Rhett Butler, Saint Simons, GA (US)

(*) Notice: Subject to any disclaimer, the term of this patent is extended or adjusted under 35 U.S.C. 154(b) by 113 days.

(21) Appl. No.: 13/746,495

(22) Filed: Jan. 22, 2013

(65) Prior Publication Data
US 2014/0202794 A1  Jul. 24, 2014

(51) Int. Cl.
*A01M 31/02* (2006.01)

(52) U.S. Cl.
CPC ............................ *A01M 31/02* (2013.01)
USPC ................ 182/187; 182/115; 182/116

(58) Field of Classification Search
CPC ........... A01M 31/02; E06C 1/04; E06C 1/06; E06C 1/08; E06C 1/34
USPC .......................................... 182/115, 116, 187
See application file for complete search history.

(56) References Cited

U.S. PATENT DOCUMENTS

| | | | | |
|---|---|---|---|---|
| 4,579,198 A * | 4/1986 | Lee | ........................ | 182/115 |
| 4,905,792 A * | 3/1990 | Wilson | ........................ | 182/187 |
| 5,253,732 A * | 10/1993 | Daniels | ........................ | 182/116 |
| 5,332,063 A * | 7/1994 | Amacker | ........................ | 182/116 |
| 5,791,436 A * | 8/1998 | Talley, Sr. | ........................ | 182/116 |
| 6,053,278 A * | 4/2000 | Myers | ........................ | 182/20 |
| 6,199,660 B1 * | 3/2001 | Meeks | ........................ | 182/116 |
| 6,505,707 B1 * | 1/2003 | Berry | ........................ | 182/20 |
| 6,811,180 B1 * | 11/2004 | Molliere | ........................ | 280/652 |
| 6,830,128 B2 * | 12/2004 | Burgeson | ........................ | 182/116 |
| 7,021,423 B1 * | 4/2006 | Pestrue et al. | ........................ | 182/116 |
| 7,232,010 B2 * | 6/2007 | Woller et al. | ........................ | 182/116 |
| 7,717,232 B2 * | 5/2010 | Butcher | ........................ | 182/178.3 |
| 8,240,432 B2 * | 8/2012 | Call | ........................ | 182/136 |
| 8,424,639 B1 * | 4/2013 | Davis | ........................ | 182/20 |
| 8,695,761 B1 * | 4/2014 | Berkbuegler | ........................ | 182/116 |
| 2002/0112919 A1 * | 8/2002 | Graham, Jr. | ........................ | 182/116 |
| 2004/0084248 A1 * | 5/2004 | Burgeson | ........................ | 182/116 |
| 2008/0105490 A1 * | 5/2008 | Butcher | ........................ | 182/116 |
| 2008/0128204 A1 * | 6/2008 | Engstrom | ........................ | 182/116 |
| 2008/0149422 A1 * | 6/2008 | Lott | ........................ | 182/187 |
| 2009/0229916 A1 * | 9/2009 | Berkbuegler | ........................ | 182/113 |
| 2009/0229917 A1 * | 9/2009 | Berkbuegler | ........................ | 182/113 |
| 2012/0168249 A1 * | 7/2012 | Furseth et al. | ........................ | 182/113 |
| 2012/0299258 A1 * | 11/2012 | Gallagher et al. | ........................ | 280/47.18 |
| 2013/0248287 A1 * | 9/2013 | Furseth et al. | ........................ | 182/115 |

* cited by examiner

*Primary Examiner* — Alvin Chin-Shue
*Assistant Examiner* — Colleen M Chavchavadze
(74) *Attorney, Agent, or Firm* — Jason T. Daniel, Esq.; Daniel Law Offices, P.A.

(57) ABSTRACT

An improved tree stand includes an elongated frame having a vertical and horizontal section. A central platform extends in an opposite direction from the frame and includes a tree connection member. A seat is provided along the upper horizontal portion of the frame, and a shooting rail having a vertically adjustable back and side sections connect the top portion of the frame to the tree.

An improved tree stand also includes a swivel mounted seat platform that transitions between an open and closed position.

20 Claims, 12 Drawing Sheets

TREE STAND

TECHNICAL FIELD

The present invention relates generally to hunting, camping, and sportsmen equipment, and more particularly to a tree stand having an improved design capable of allowing a virtual 360 degree field of view.

BACKGROUND

The statements in this section merely provide background information related to the present disclosure and may not constitute prior art.

Numerous devices for attachment to trees and the like, in order to provide an elevated observation area for hunting and other such activities have been previously disclosed in the art. FIG. 1 illustrates one example of a conventional tree stand 4 that includes a vertical central frame 4a having a plurality of integrated steps 4b extending upward until terminating at a seat 5. The fixed seat is integrated into the frame so that the seat bottom 5a and the seat back 5b abut the tree 2 on which the stand is affixed via a conventional ratchet strap 7. A swing down safety/shooting rail 6 is pivotally secured to the stand along the back edges to surround the user sitting in the seat 5.

Although the conventional tree stand is adequate for providing a simple elevated platform, they also suffer from several deficiencies when used specifically for hunting. For example, when the stand is secured to the tree 2, a user 1 sitting on the seat 5 and utilizing the safety rail 6 has a field of view A that extends only to objects directly in front of, or on the side of the stand. As such, any activities occurring behind the user B cannot be viewed without requiring the user to raise the safety rail and stand on the seat bottom 5a. Such a process is inherently dangerous as the user's close proximity to the tree requires them to lean out and away from the tree when attempting to view objects in that direction.

Additionally, the swing down safety rail can only be positioned in either an up (i.e., vertical) or down (i.e., horizontal) position. As is known to those of skill in the art, the optimum vertical height of the rail is different when the hunter uses a bow versus a riffle. For this reason, conventional tree stands are often manufactured to specifically suit only one of these types of activities, and do not lend themselves well to the other.

Finally, as the conventional tree stand is designed to afford users an elevated and unobstructed view of activities in front of the stand, there is no natural camouflage between the user and their prey. As a result, users must be careful not to make any movements which could startle their prey, or must hang sheets of camouflage netting which is a cumbersome process.

Accordingly, the need exists for an improved tree stand capable of allowing users to view objects in a virtual 360 degree field of view that does not suffer from the drawbacks discussed above.

SUMMARY OF THE INVENTION

The present invention is directed to an improved tree stand. One embodiment of the present invention can include an elongated frame transitioning from a generally vertical section to a generally horizontal section. A central platform extends in an opposite direction from the frame and includes a connection member for engaging a tree. A seat is provided along the upper horizontal portion of the frame, and a shooting rail having a vertically adjustable back and side sections connect the top portion of the frame to the tree.

Another embodiment of the present invention can include a swivel mounted seat platform capable of pivoting between an open and closed position. The seat can be mounted to the platform and capable of rotating 360 degrees.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Figure 1:
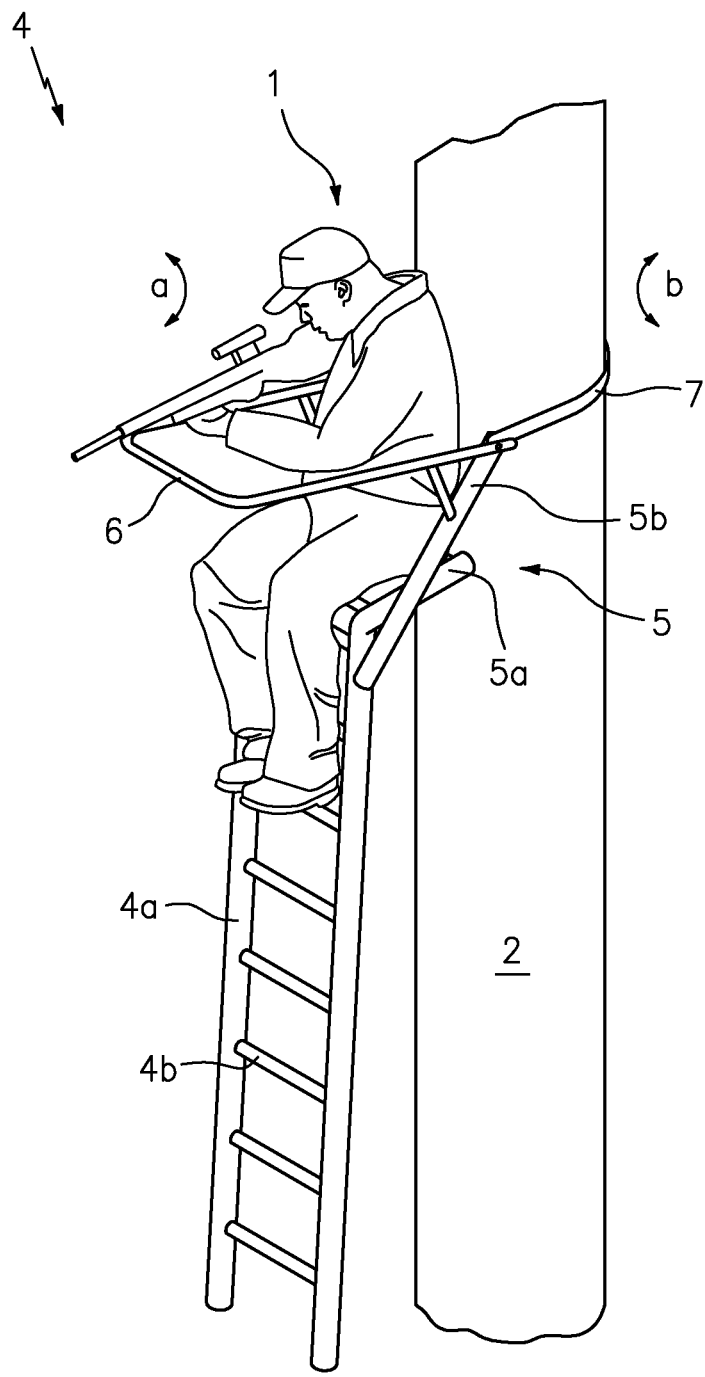
FIG. 1 is a front view of a tree stand in accordance with background art.
Figure 2:
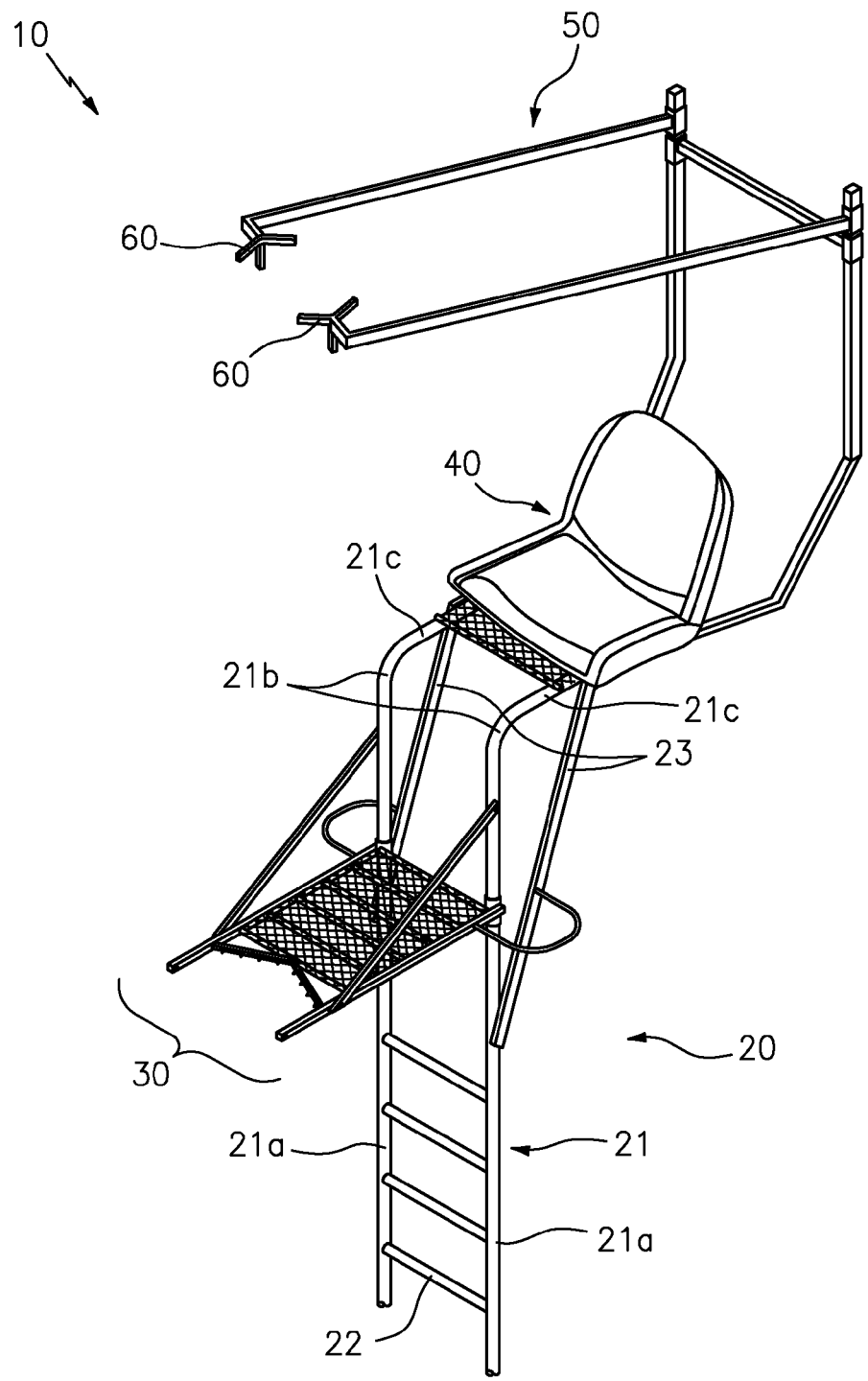
FIG. 2 is a side view of an improved tree stand in accordance with one embodiment of the invention.

For purposes of this description, the terms "upper," "bottom," "right," "left," "front," "vertical," "horizontal," and derivatives thereof shall relate to the invention as oriented in FIG. 2.

FIGS. 2-10 illustrate one embodiment of an improved tree stand 10, which can act as an elevated platform for allowing a user to enjoy a virtual 360 degree field of vision. As shown, the improved tree stand 10 can include, essentially, a main frame 20, a central platform 30 a folding and rotating seat 40, and adjustable rail mounts 50. As will be readily apparent to those of skill in the art, the design of the improved tree stand 10 represents an extreme departure from the conventional art by positioning the seat at a location away from the tree, and by allowing the shooting rails 50 to be directly secured to the tree. Unlike traditional stands which are designed to be positioned in front of the tree, the presently claimed invention is specifically designed to be positioned behind the tree so that the user can be afforded the natural camouflage of the tree itself. Additionally, the adjustable rails having a sturdy connection point on both ends allow the user to stand on the platform and lean against the rails in a safe and secure manner only previously available with permanent structures. Such features provide the user with a stable seated position for utilizing a rifle, or the ability to stand and use a bow.

Now that one embodiment of the overall concept has been identified, the following description will be directed to the various components of the improved tree stand in accordance with one embodiment. Although described below as including specific materials and/or construction methodologies, this is for illustrative purposes only, as any number of other materials and methods can be utilized to achieve the inventive concepts disclosed herein.

The main frame 20 according to one embodiment, can include a pair of elongated, generally parallel frame members 21 each having a vertical climbing portion 21a, a curved transition portion 21b and a generally horizontal top portion 21c. A plurality of steps 22 are disposed between the parallel frame members 21 along the climbing portion 21a. Additionally, a pair of frame support braces 23 can extend diagonally from the climbing portion 21a to the horizontal portion 21c, to support the weight of the seat and user.

Figure 3:
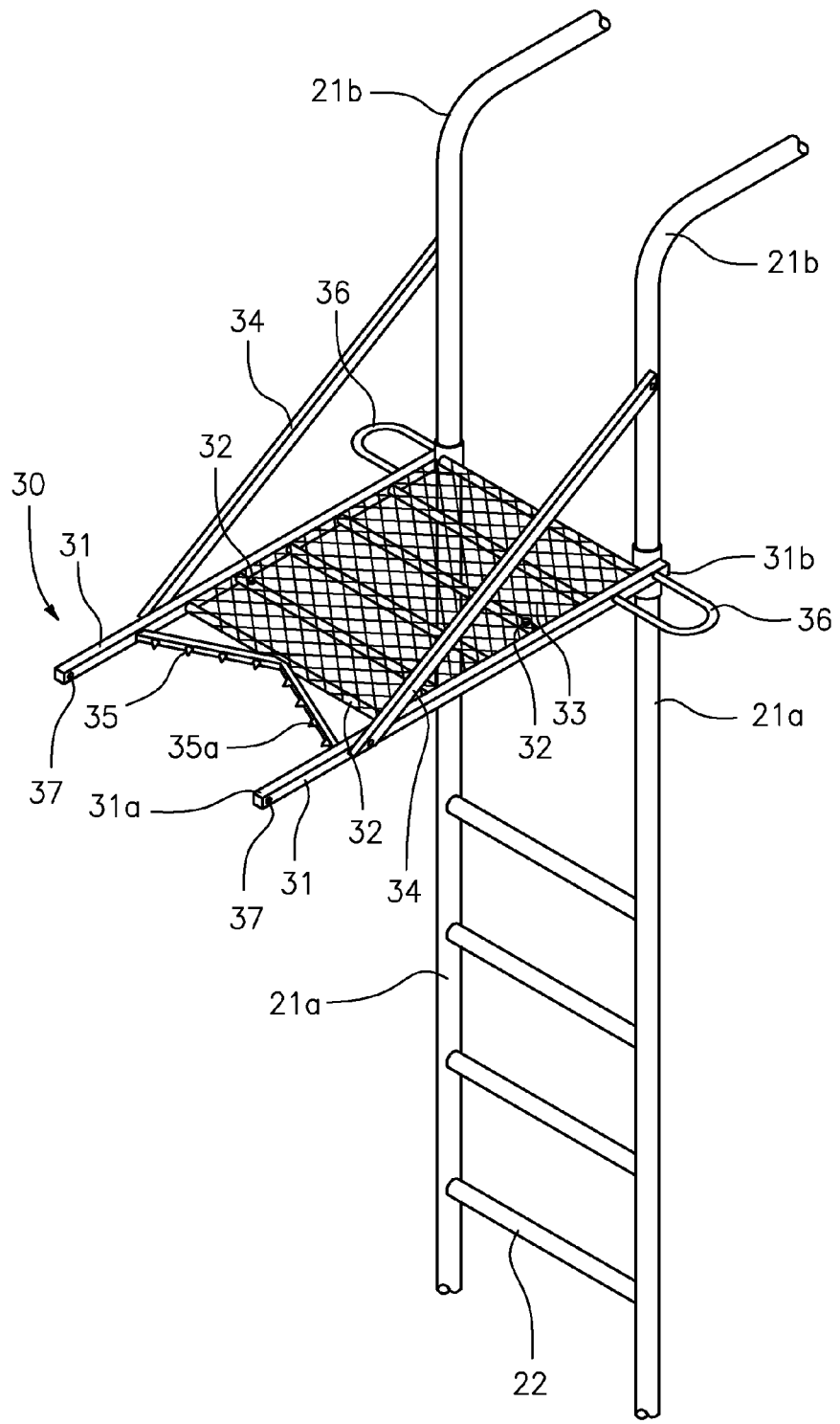
FIG. 3 is a side perspective view of a central platform of the improved tree stand in accordance with one embodiment of the present invention.

As shown best in FIG. 3, the central platform 30 serves the dual function of providing a connection point for the tree, and for providing the user a place to stand. In one preferred embodiment, the central platform 30 can include a pair of elongated platform members 31 each having a first end 31a that is in communication with one of the frame members 21 and a second end 31b that extends outward in a direction that is opposite to the direction of the upper portion 21c of the frame members. The platform 30 can further include a plurality of cross members 32 and/or steel mesh 33 disposed between the platform members 31. The cross members and/or mesh acting to create a flat deck capable of withstanding the weight of a user. Additionally, a pair of optional support beams 34 can also communicate with the frame members 21 to provide the platform with additional strength. In one preferred embodiment, each of the platform members can preferably include one or more openings 37 located thereon. Openings 37 being provided to accommodate one or more retention straps 7 for securing the tree stand to a tree in a conventional manner.

In one embodiment, the platform can further include a generally V-shaped connection beam 35 that is interposed between the platform members 31 along their distal end. The V-shaped beam 35 forming a channel having a large surface area for receiving the generally tubular shape of a tree. In one embodiment, a plurality of optional gripping teeth 35a can be provided on the connection beam for engaging the bark of the tree when the device is in use. Finally, a pair of foot rests 36 can be located along the side portion of the platform to provide support for a user's feat when sitting in the chair 40.

Figure 4A:
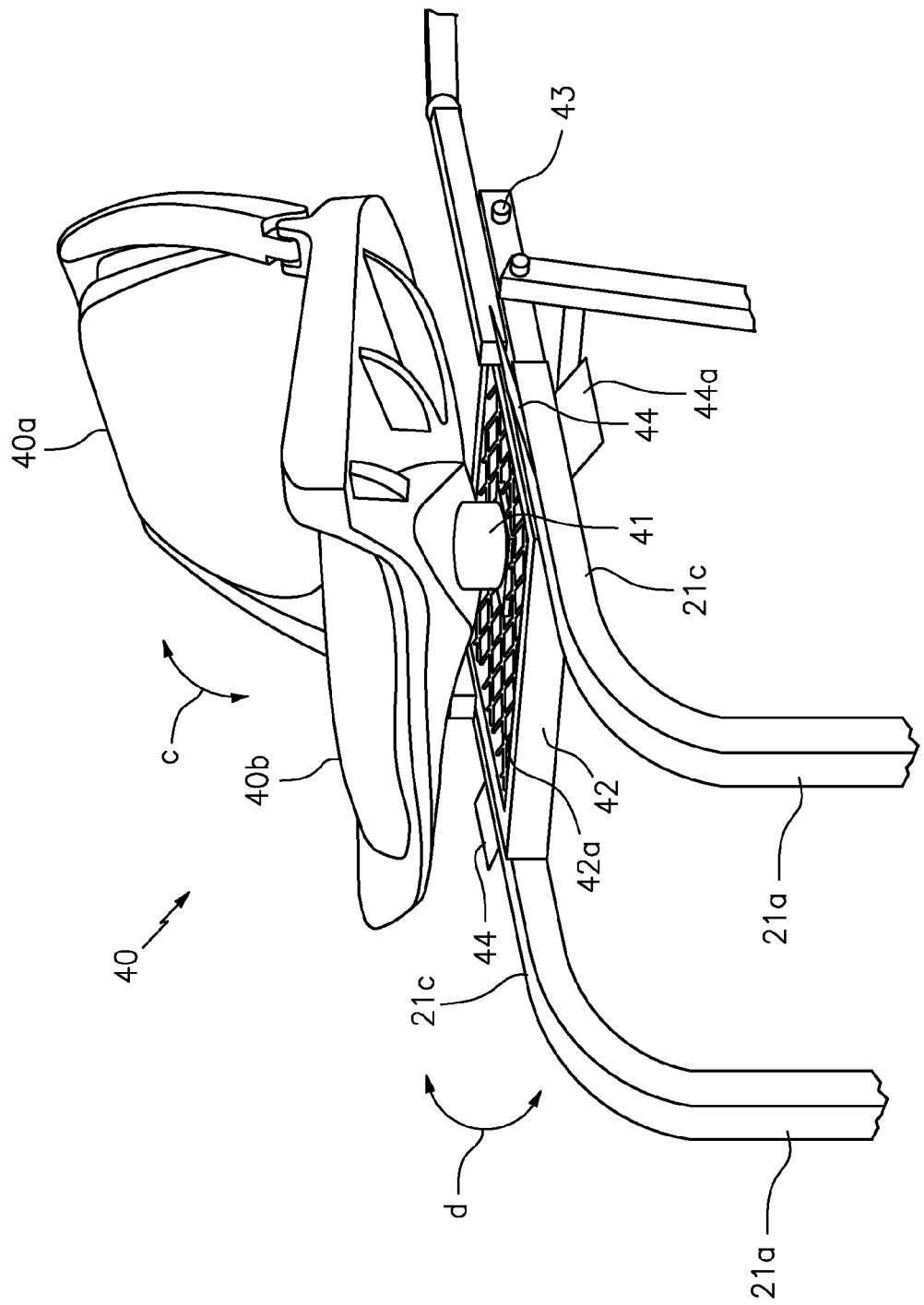
FIG. 4a is a side perspective view of the seat of the improved tree stand in accordance with one embodiment of the present invention.
Figure 4B:
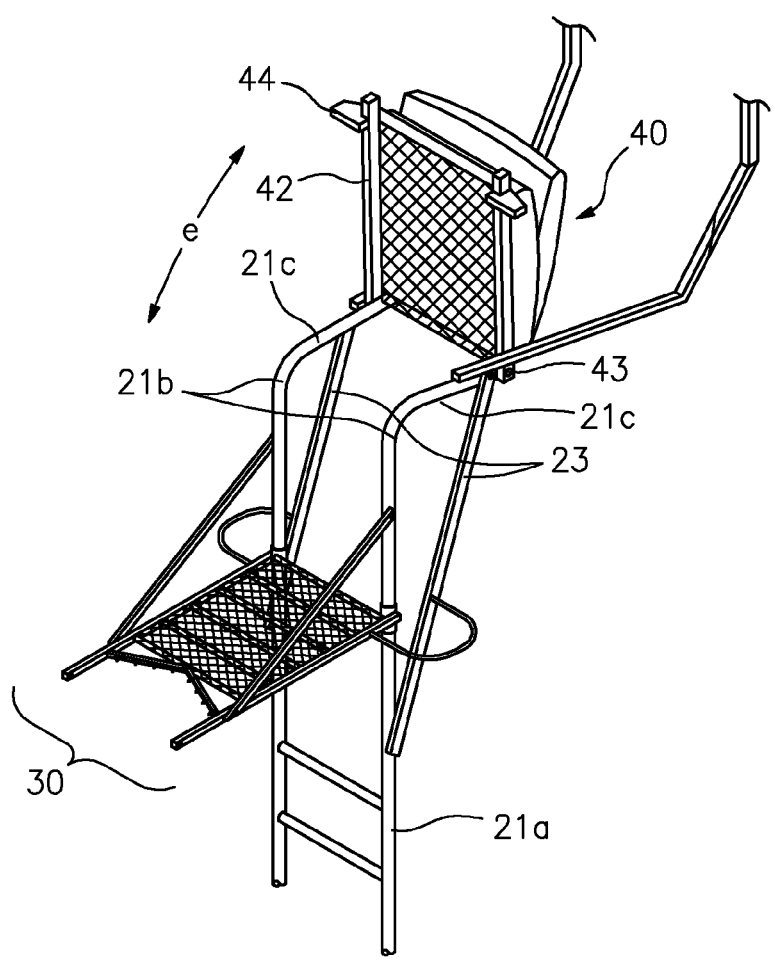
FIG. 4b is another side perspective view of the seat of the improved tree stand in accordance with one embodiment of the present invention.

FIGS. 4a and 4b illustrate one embodiment of a seat 40 which can be included with the improved tree stand 10. As shown, the seat can include a traditional folding chair having a back portion 40a, a bottom portion 40b and a swing mounted seat platform 42. In one preferred embodiment, the seat back 40a can fold over the seat bottom 40b (see arrow c) and the seat bottom can be mounted to the seat platform 42 via a conventional swivel seat mounting bracket 41. Such a feature can allow the seat to swivel a full 360 degrees when in use (see arrow d).

In one preferred embodiment, the seat platform 42 can be swing mounted to the frame members 21c, and can include a generally rectangular member having an upper surface 42a for mating with the swivel mount 41 of the seat. As described herein, the platform can be swing mounted by securing the back corners of the seat platform 42 to the frame members 21c via a pair of axel pins 43 or other known hardware capable of securely positioning the seat platform 42 to the frame members 21c, while simultaneously permitting the remainder of the seat platform to rotate about the pin (See arrow e). Additionally, one or more outward radiating seat stops 44 can be secured to the seat platform along the front corners in order to engage the top surface of the frame members 21c when the seat is in a down position. Moreover, one or more sliding seat stops 44a can also be provided beneath the seat stops 44 and can be configured to slide in and out so as to engage the bottom surface of the frame members 21c. Such a feature can act to ensure that the seat platform will not transition between an open position (FIG. 4b) and closed position (FIG. 4a) while in use.

Although illustrated above as utilizing an axel pin, a fixed protrusion and one or more sliding protrusions, this is for illustrative purposes only, as any number of other known hardware capable of achieving the above noted features can be utilized herein. Several examples including traditional hinges, bump stops and locking mechanisms, for example. Moreover, although described above as including a rotating swivel chair having an integrated seat platform capable of transitioning the seat between an open and closed position, other embodiments are also contemplated. For example, any number of fixed mounted and/or non-articulating seats which may or may not have a back section suitable for allowing an adult human to sit can be utilized herein. Finally, the seat 40 itself can be secured to the platform in a removable manner via any number of quick connection fittings (not illustrated) to allow the seat platform 42 to function as a secondary elevated platform (See FIG. 10).

Figure 5A:
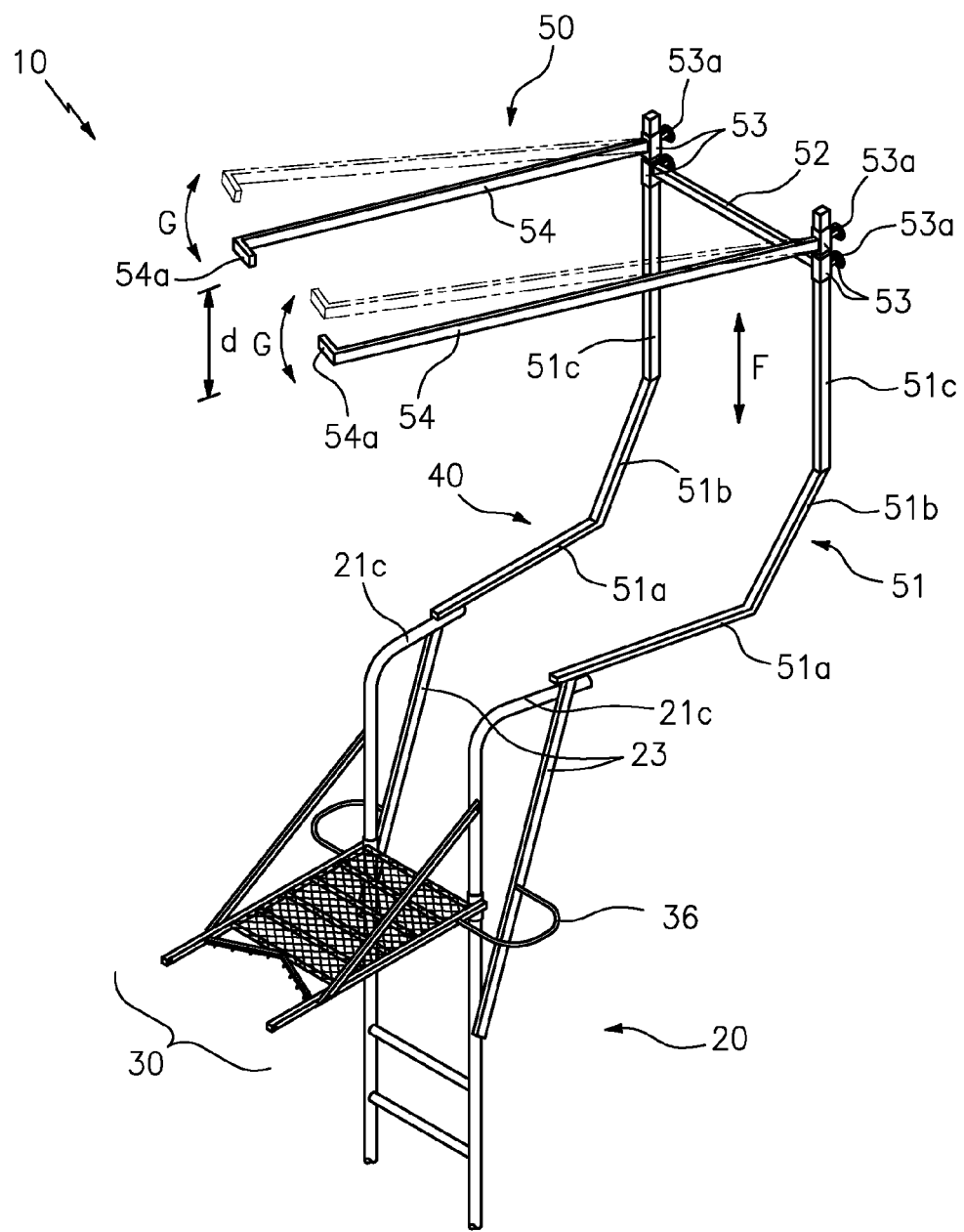
FIG. 5a is a simplified side view of the frame, platform and adjustable shooting rail of the improved tree stand in accordance with one embodiment of the present invention.
Figure 5B:
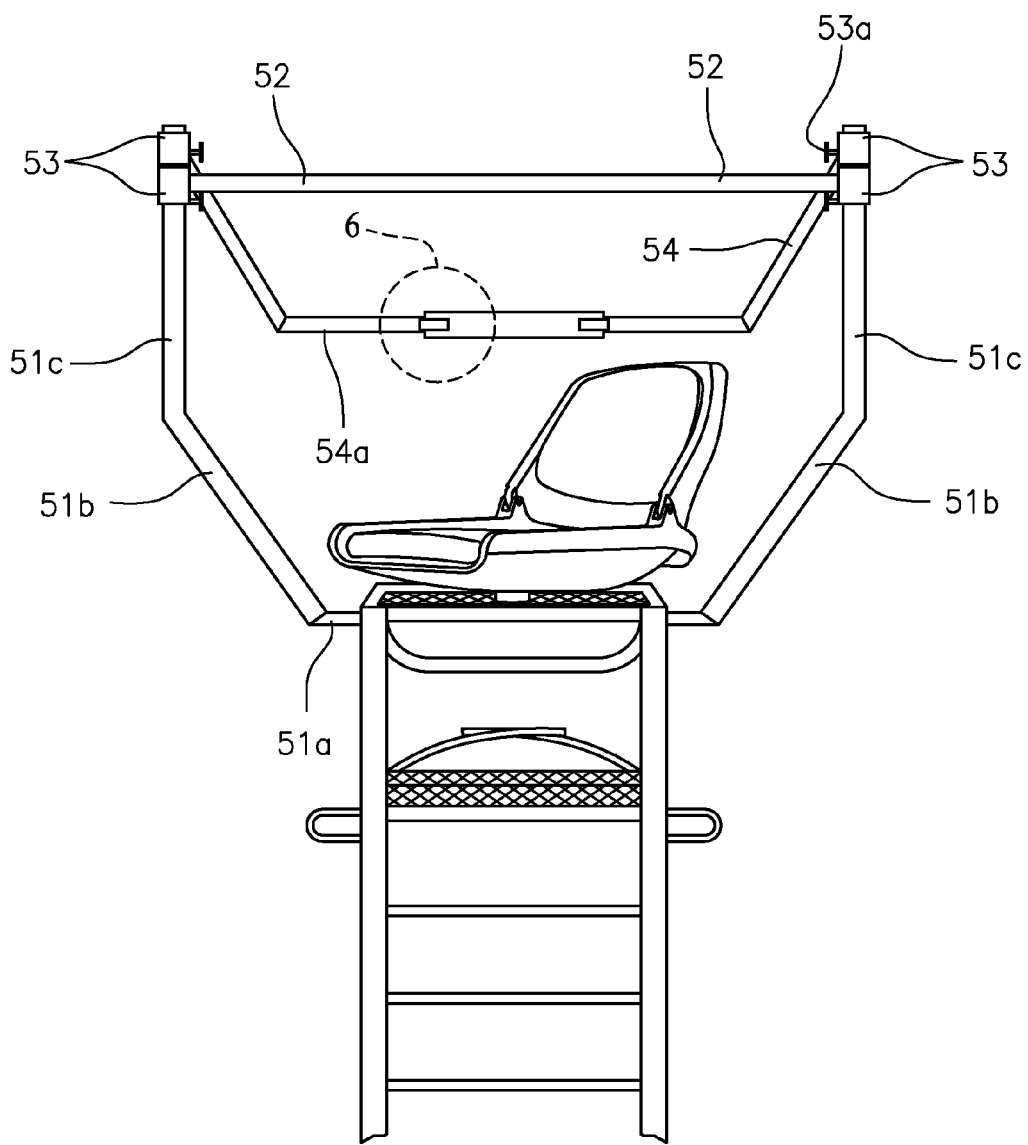
FIG. 5b is a rear side view of the improved tree stand in accordance with one embodiment of the present invention.

FIGS. 5a and 5b illustrate one embodiment of the adjustable shooting rail 50, where FIG. 5a is a simplified cutout view of the device without the seat for clarity. As shown, the adjustable shooting rail can include, essentially, a pair of fixed angled rail members 51, an adjustable back rail 52 and a pair of adjustable side rails 54.

Each of the fixed angle rails 51 can be secured to one of the frame members 21c, and can include a generally horizontal portion 51a, an angled portion 51b and a vertical portion 51c. The adjustable rear rail 52 can be secured on each end to the vertical rails 51c via a pair of receivers 53, and one end of each adjustable side rail 54 can also be connected to one of the vertical rails 51c via another receiver 53. As described herein, a receiver 53 can include a generally tubular element having a hollow central portion through which the vertical rail 51c can be located. The receiver can further include any number of conventional fasteners 53a, such as a threaded bolt, for example which can be inserted through one or more threaded openings (not shown) in the receiver body to impart a pressure on the vertical rail 51c, as is known in the art. Such a feature can allow the side rails 54 and the rear rail 52 to slide up and down (see arrow f) along the vertical rails 51c and to be securely fastened at any desired height by a user. Of course, any number of other conventional hardware capable of securing two elements together in an adjustable manner can also be utilized herein. One suitable example can include a conventional pipe clamp, for example.

As shown, only one end of each of the side rails 54 is secured to a vertical rail 51c. As such, in addition to being affixed to the rail 51c at a plurality of heights (see arrow f), each side rail 54 can also swing in and out across a horizontal plane (see arrow g). In this regard, the distance D between each opposing end 54a of each side rail, which includes an approximately 90 degree bend, can be independently adjusted by the user. As will be described below, this feature advantageously allows an included rail grip 60 to be mounted directly to the tree regardless of how big or small the tree is.

Figure 6:
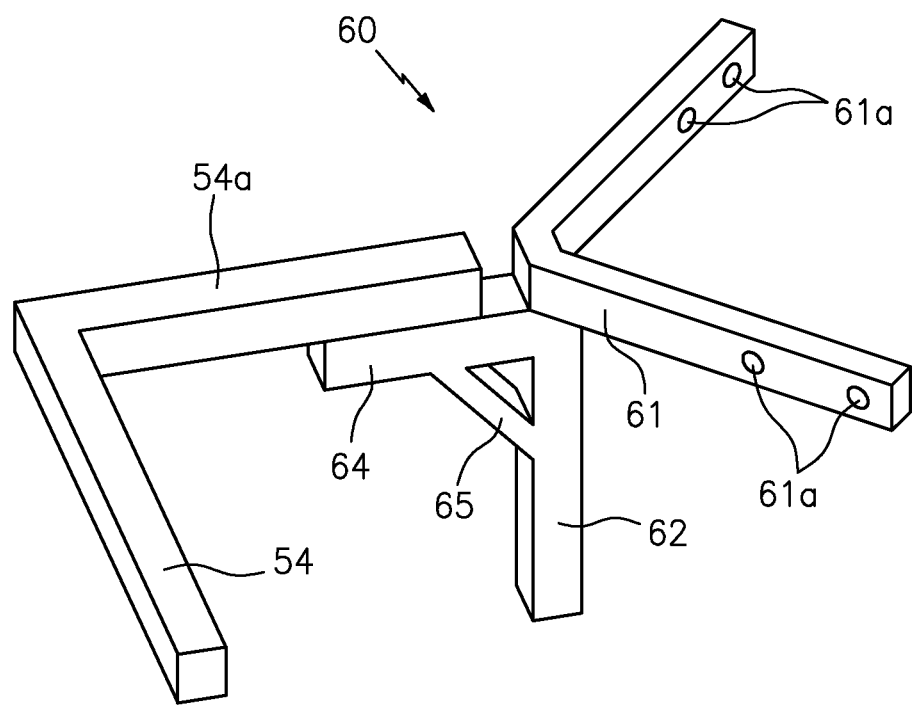
FIG. 6 is a cutout view of a rail grip of the improved tree stand in accordance with one embodiment of the present invention.
Figure 7:
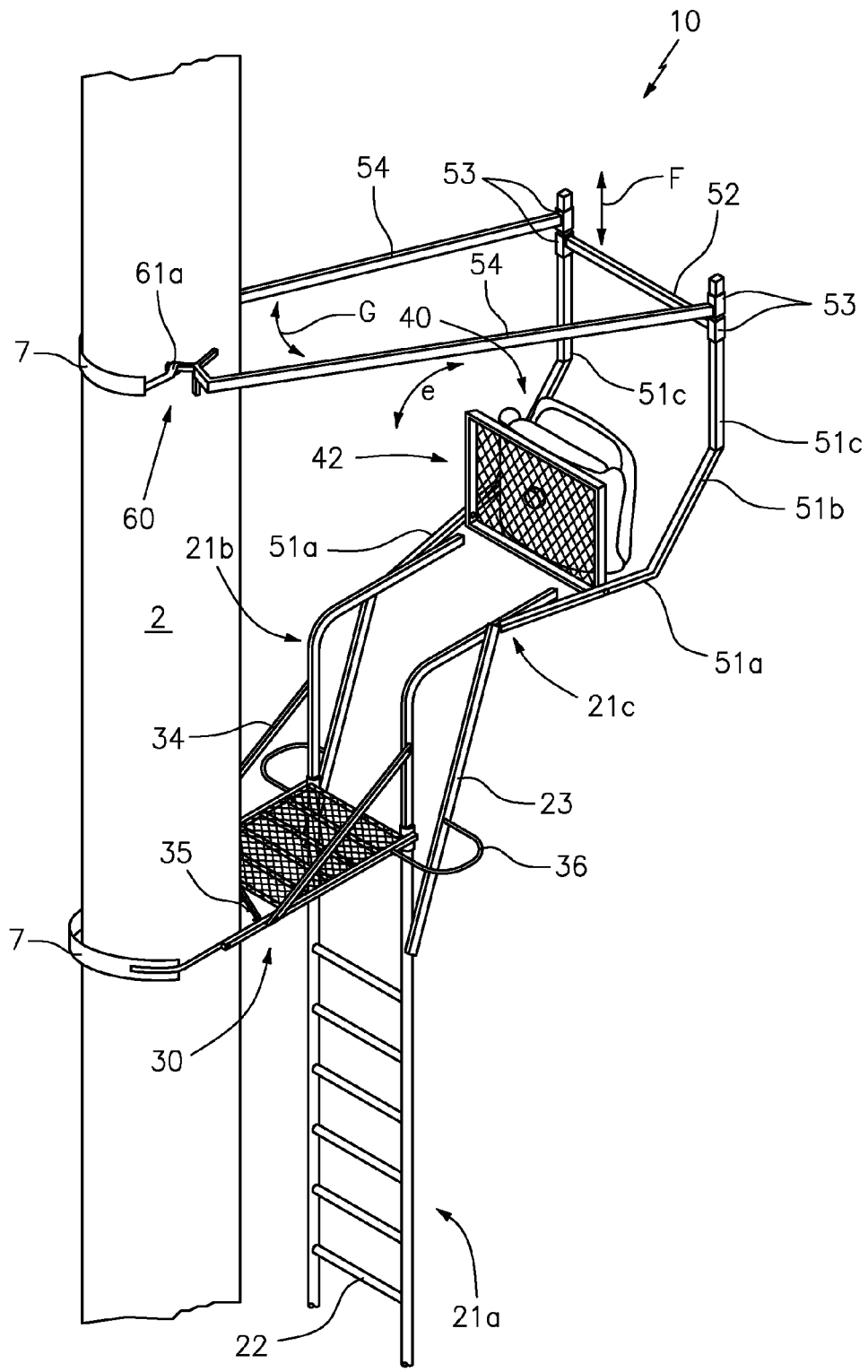
FIG. 7 is a side perspective view of the improved tree stand in accordance with one embodiment of the present invention.
Figure 8:
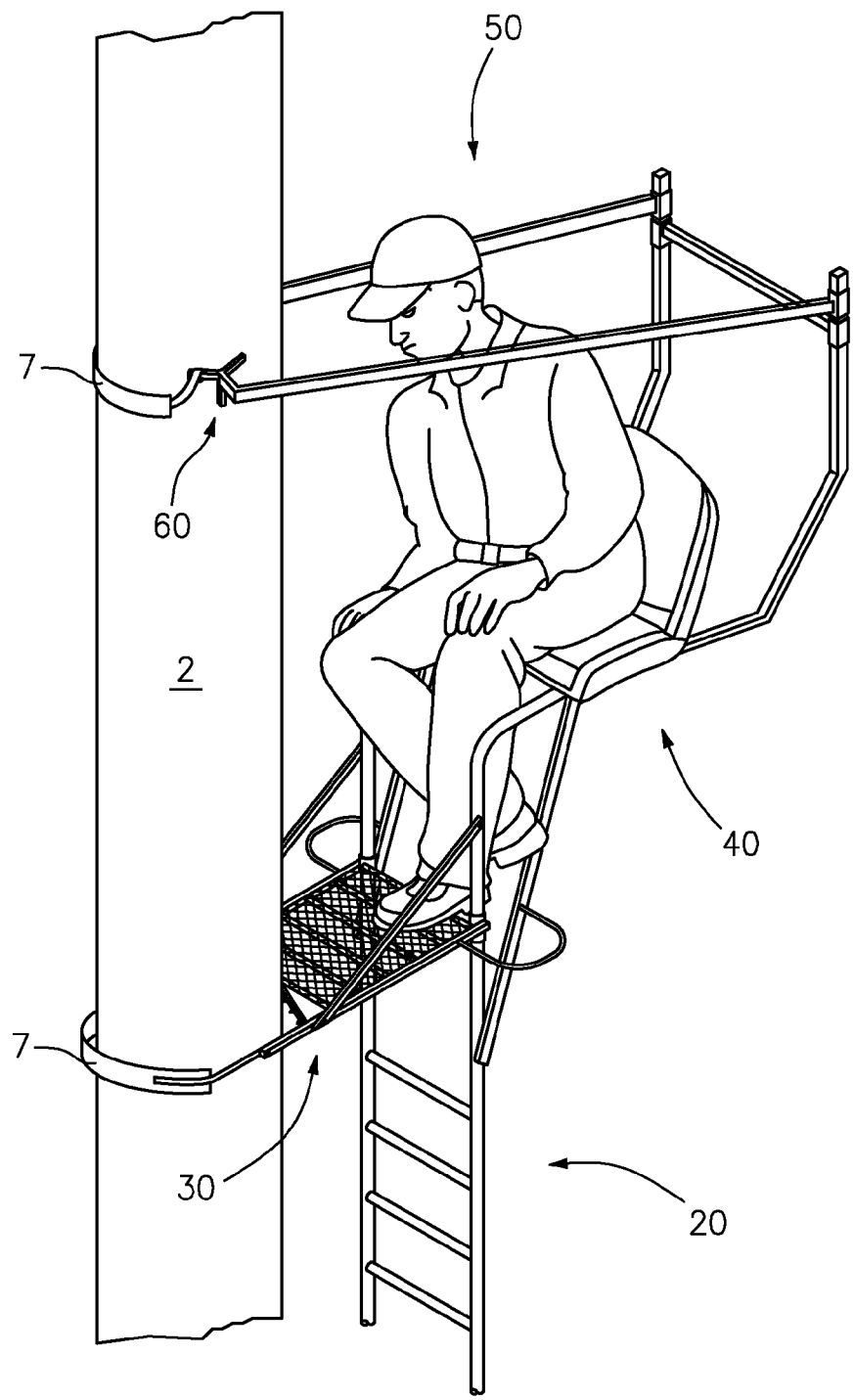
FIG. 8 is another side perspective view of the improved tree stand in accordance with one embodiment of the present invention.
Figure 9:
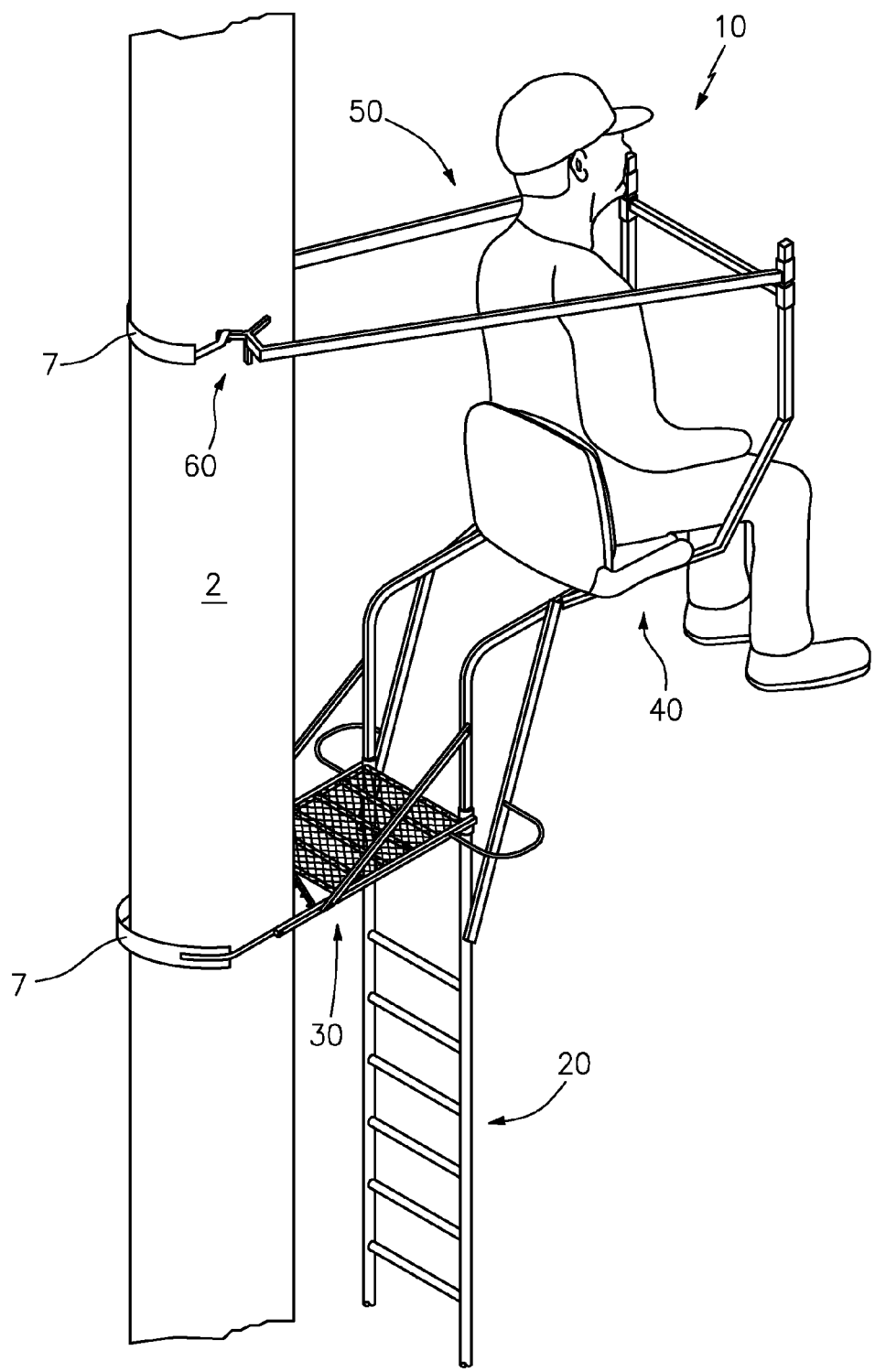
FIG. 9 is yet another side perspective view of the improved tree stand in accordance with one embodiment of the present invention.
Figure 10:
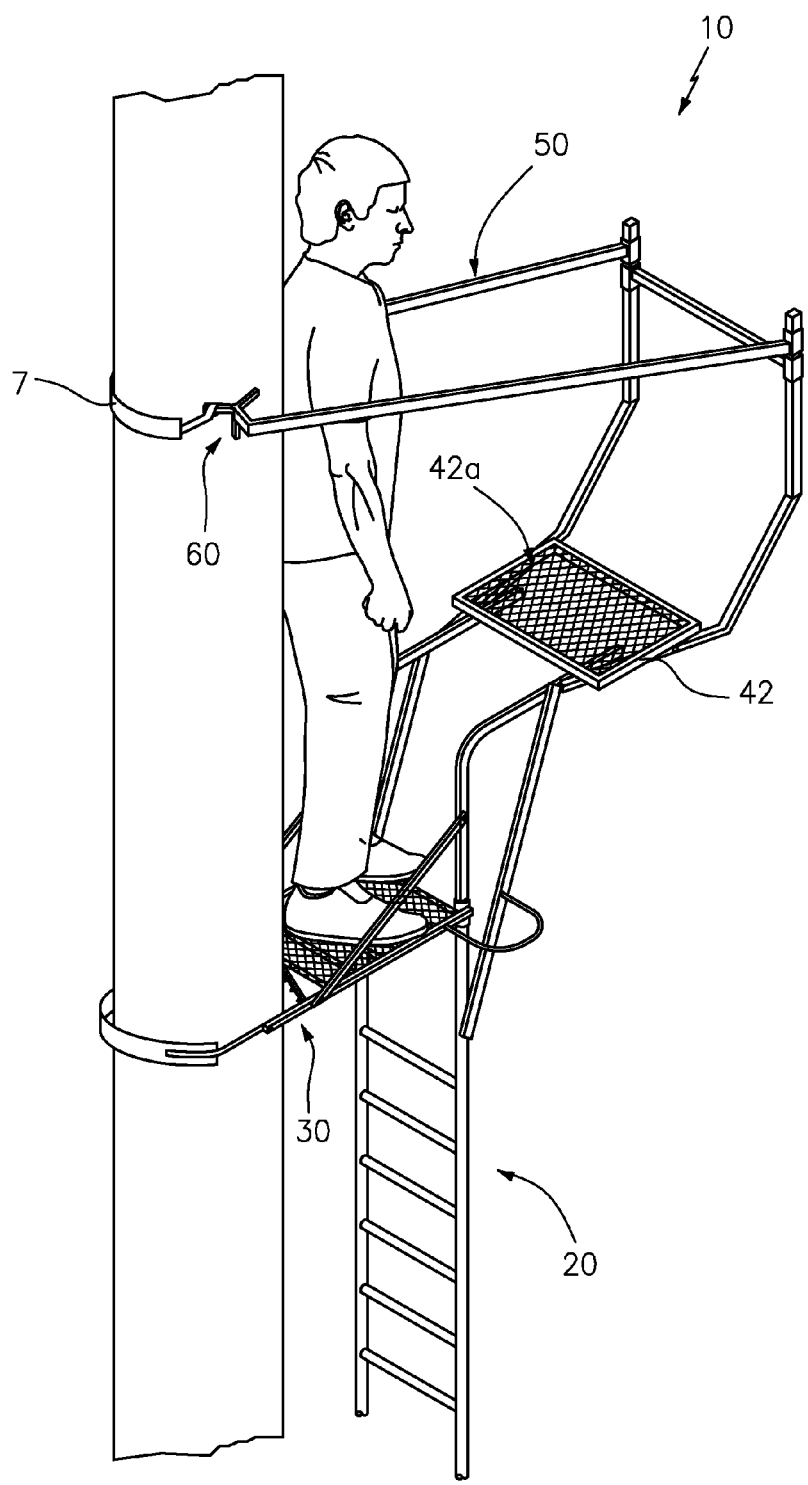
FIG. 10 is a side perspective view of the improved tree stand in accordance with another embodiment of the present invention.

FIG. 6 is a cutout view of one of the rail grips 60 shown in FIG. 5b. As shown, each rail grip 60 can include a generally V-shaped connection member 61 having a plurality of openings 61a for receiving a conventional ratchet strap or other such hardware suitable for mounting the rail onto a tree. A generally vertical shaft 62 extends beneath the connection member 61 in order to provide three surfaces for contacting the tree. A horizontal member 64 joins each of the vertical shaft 62, the V-member 61 and the side rail 54a, and a diagonal support strut 65 is positioned between members 62 and 64 to prevent damage to the grip when in use. Although not illustrated, the rail grips 60 can also include a plurality of optional gripping teeth such as those illustrated above (see element 35). The support strut 65 can be used in conjunction with, or as an alternative to the openings, in order to provide a suitable location for receiving the anchor strap 7.

In operation, and as shown in FIGS. 7-10, the improved tree stand 10 can be positioned in an upright manner against a tree 2 at which time the V-shaped connection member 35 of the platform 30 can be strapped to the tree via a conventional retention strap 7. During the setup of the stand, the seat platform 42 can be positioned in an open position (arrow e) in order to provide additional room for the user to access the platform 30.

Next, the height of the rear and side members of the shooting rail 52 and 54, respectively, can be adjusted (arrow f) via the retainers 53, and each of the side arms 54 can be swing toward the tree (arrow g) until the rail grips 60 make contact. Finally, each of the rail grips can be ratcheted to the tree via additional straps 7 that are connected to the openings 61a.

When so positioned, the improved tree stand 10 can be secured behind the tree to afford the user 1 the natural camouflage of the tree itself. As shown, by placing the seat away from the tree, the user is able to view objects on either side of the tree, and directly behind the tree itself by either leaning to one side or by standing on the platform 30. Finally, by customizing the height of the shooting rails 52 and 54, the improved tree stand can be field customized for the type of activity desirable to a user such as bow or rifle hunting.

Accordingly, the improved tree stand 10 advantageously provides a stable platform capable of greatly increasing the field of vision of a user and providing a single device capable of sustaining different types of outdoor activities.

While the dimensions of the elements are not critical, in one embodiment the frame members 21 can be separated by a distance of approximately 18-30 inches. The climbing portion of the frame 21a terminating at the platform 30 can include a length of between 9 and 15 feet, and the platform 30 can include a length of between 18 and 36 inches from the first end 31a to the second end 31b. The upper portion of the frame members 21c can include a length of between 24 and 36 inches, and the vertical rail elements 51c can include a length of between 24 and 48 inches. Of course other dimensions are also contemplated.

As described herein, one or more elements of the collapsible tree stand device and system can be secured together utilizing any number of known attachment means such as, for example, screws, glue, compression fittings and welds, among others, and can be constructed utilizing any number of known materials and construction methodologies. In one preferred embodiment, each of the frame members 21, steps 22, platform members 31, seat platform members 42 and adjustable rails 51 52 and 53 can be constructed from ¾ inch square steel tubing having excellent strength and weather resistant qualities. Of course any number of other suitable materials such as coated steel or aluminum, for example, can also be utilized herein.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An improved tree stand device, comprising:
a frame having a pair of elongated generally parallel frame members each including a generally vertical portion, a curved transition portion extending in a first direction, and a generally horizontal portion;
a plurality of steps secured between each of the frame members along the respective vertical portions;
a central platform having a first end that is secured to each of the frame members at a location below the curved transition portion, said platform extending outward in a second direction that is opposite to the first direction;
a generally V-shaped connection member disposed along a second end of the central platform, said connection member being configured to communicate with a tension strap to securely engage a tree;
a seat configured to receive a user, said seat being located above the respective horizontal portions of the frame members;
a shooting rail secured to each of the frame members along the respective horizontal positions, said rail including a first and second elongated angled member that are in communication with a vertically adjustable back member, and a first and second vertically adjustable side member, respectively; and
a pair of rail grips secured to each of the adjustable side rail members, said grips being configured to secure the side rail members to the tree via another tension strap.

2. The device of claim 1, further comprising:
a seat platform interposed between the seat and the horizontal frame members.

3. The device of claim 2, wherein the seat platform is swing mounted to the horizontal frame members, and is configured to transition between an open position and a closed position.

4. The device of claim 3, further comprising one or more seat stops configured to position the seat platform in the closed position.

5. The device of claim 4 further comprising:
at least one sliding seat stop configured to lock the seat platform in one of the closed position and the open position.

6. The device of claim 2, wherein the seat is configured to rotate 360 degrees.

7. The device of claim 2, wherein the seat is removably secured to the seat platform.

8. The device of claim 1, wherein each of the first and second side members of said shooting rail include a curved end portion that are separated by a separation distance.

9. The device of claim 8, wherein each of the first and second side rail members are configured to swing across a horizontal plane in order to change the separation distance.

10. The device of claim 1, wherein each of the rail grips include a generally V-shaped rail grip member and a generally vertical rail grip member, said members being configured to provide three contact points for receiving the tree.

11. The device of claim 1, wherein the central platform includes a steel mesh surface and a plurality of cross mounted support members.

12. The device of claim 1, further comprising:
a plurality of openings disposed along the second end of the platform at a location adjacent to the v-shaped connection member, said openings being configured to engage the retention strap.

13. The device of claim 1, further comprising:
a plurality of teeth disposed along one surface of the V-shaped connection member, said teeth being configured to engage a bark section of the tree.

14. The device of claim 1, further comprising:
a pair of footrests disposed along each side of the platform.

15. The device of claim 1, wherein the seat is configured to fold in half.

16. An improved tree stand device, comprising:
a frame having a pair of elongated generally parallel frame members each including a generally vertical portion, a curved transition portion extending in a first direction, and a generally horizontal portion;
a plurality of steps secured between each of the frame members along the respective vertical portions;
a central platform having a first end that is secured to each of the frame members at a location below the curved transition portion, said platform extending outward in a second direction that is opposite to the first direction;
a generally V-shaped connection member disposed along a second end of the central platform, said connection member being configured to communicate with a tension strap to securely engage a tree;
a seat; a seat platform interposed between the seat and the horizontal portions of said frame members;
a shooting rail secured to each of the frame members along the respective horizontal positions, said rail including a first and second elongated angled member that are in communication with a vertically adjustable back member, and a first and second vertically adjustable side member, respectively; and
a pair of rail grips secured to each of the adjustable side rail members, said grips being configured to secure the side rail members to the tree via another tension strap.

17. The device of claim 16, wherein the seat platform is swing mounted to the horizontal frame members, and is configured to transition between an open position and a closed position.

18. The device of claim 17, further comprising:
a folding seat that is removably secured to the seat platform via a swivel seat mounting bracket.

19. The device of claim 16, wherein each of the first and second side members of said shooting rail include a curved end portion that are separated by a separation distance.

20. The device of claim 19, wherein each of the first and second side rail members are configured to swing across a horizontal plane in order to change the separation distance.

* * * * *